C. F. BLAKE.
DUMP CAR.
APPLICATION FILED JUNE 26, 1909.
966,075.
Patented Aug. 2, 1910.
3 SHEETS—SHEET 1.
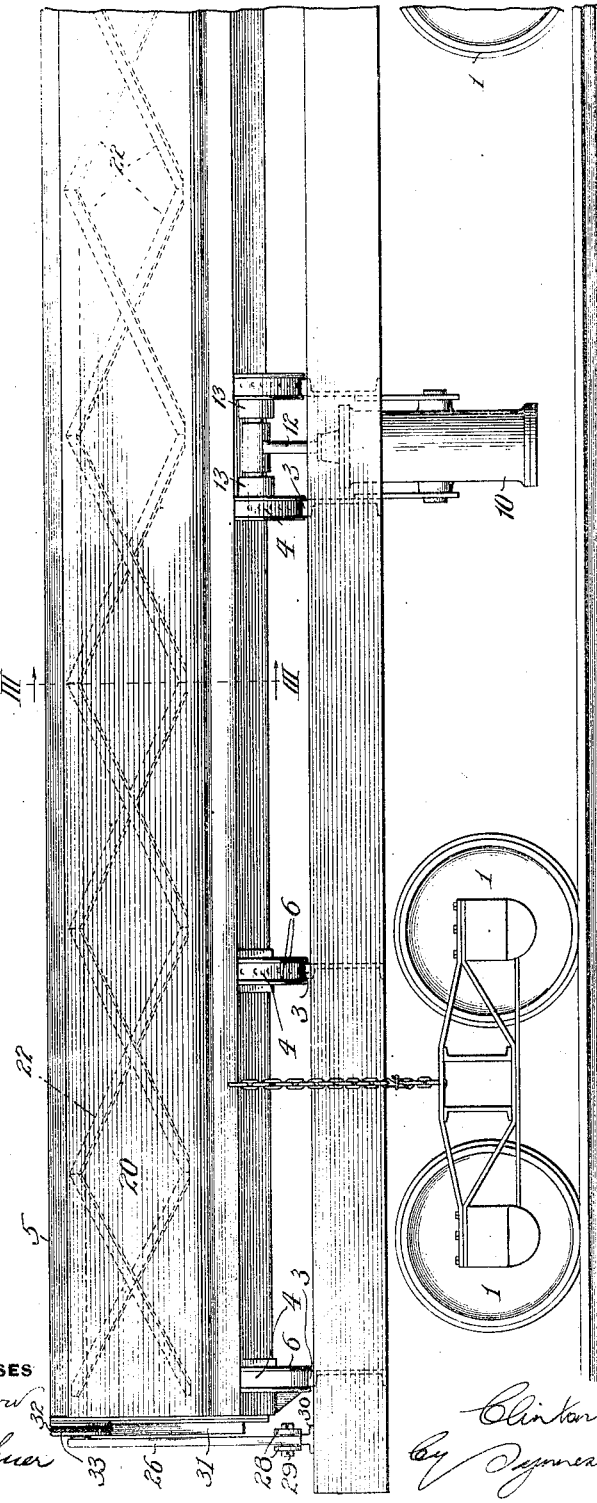

C. F. BLAKE.
DUMP CAR.
APPLICATION FILED JUNE 26, 1909.
966,075.
Patented Aug. 2, 1910.
3 SHEETS—SHEET 2.
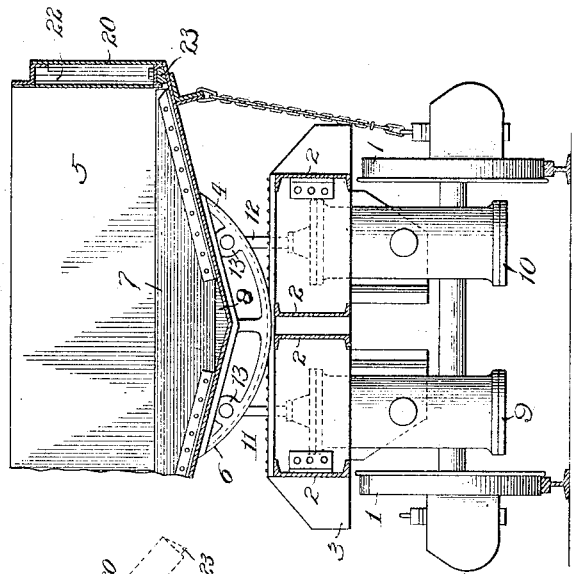
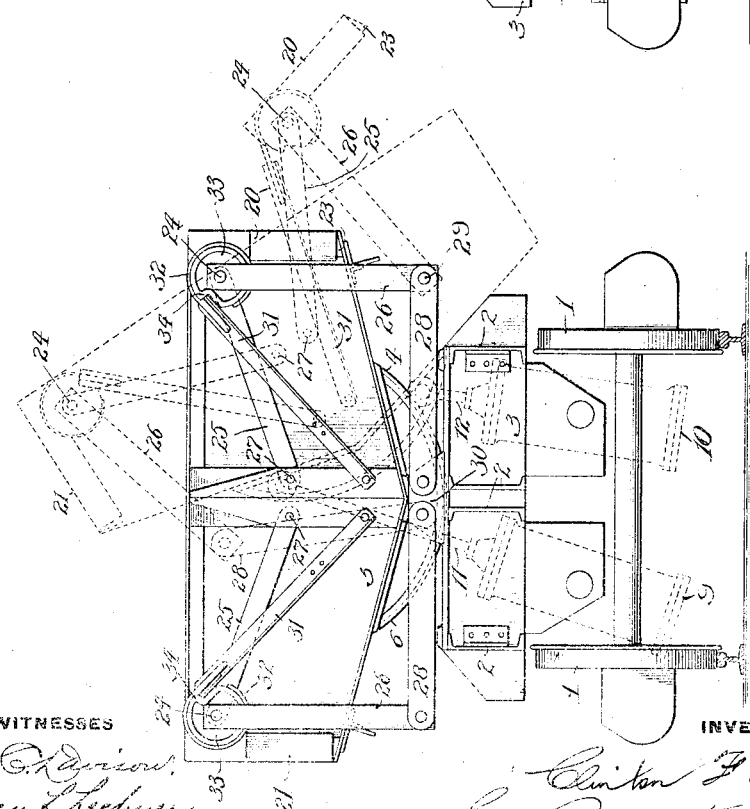
WITNESSES
INVENTOR
Clinton F. Blake

C. F. BLAKE.
DUMP CAR.
APPLICATION FILED JUNE 26, 1909.

966,075.

Patented Aug. 2, 1910.
3 SHEETS—SHEET 3.

WITNESSES

INVENTOR
Clinton F. Blake

UNITED STATES PATENT OFFICE.

CLINTON F. BLAKE, OF CHICAGO, ILLINOIS.

DUMP-CAR.

966,075.  Specification of Letters Patent.  Patented Aug. 2, 1910.

Application filed June 26, 1909. Serial No. 504,520.

*To all whom it may concern:*

Be it known that I, CLINTON F. BLAKE, a citizen of the United States, residing at Chicago, in the county of Cook and State of Illinois, have invented certain new and useful Improvements in Dump-Cars, of which the following is a specification.

The invention relates to dump cars, and particularly to those of the side door type.

It has for its principal objects; the provision of a car of the character specified having a container especially adapted to carry material with which fluids are more or less mixed, such as garbage, and one having improved operating means for the doors; the provision of a car in which tight joints at the doors are insured; the provision of a car of large capacity and one from which the contents may be discharged without difficulty; and the provision of a car having the frame-work of exceedingly simple and rigid construction.

One embodiment of the invention is illustrated in the accompanying drawings, wherein:—

Figure 5:
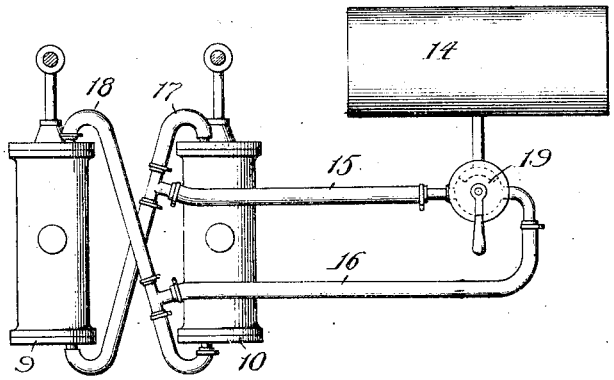
Figure 4:
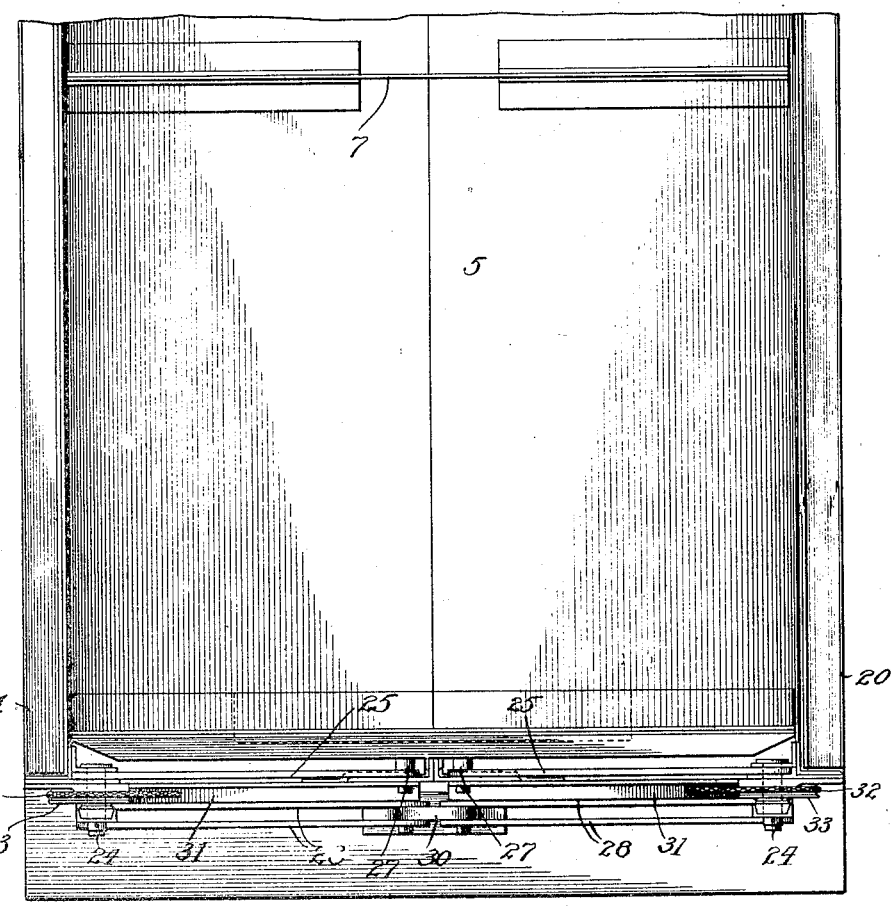

Figure 1 is a partial side elevation of the car; Fig. 2 is an end elevation; Fig. 3 is a section on the line III—III of Fig. 1; Fig. 4 is a partial plan view taken at one end of the car, and Fig. 5 is a diagrammatic view showing the arrangement of the operating rams and their connections.

The car comprises the usual wheels 1, the frame thereabove and the box or container mounted for tilting upon the frame. The support between the wheels and frame is not illustrated but is of the usual character. The frame preferably consists of four channel beams 2, (Figs. 1 and 3) secured together by the cross or tie-beams 3, the heads of which project slightly above the tops of the channel beams. The tops of these beams serve as the rocking base for rockers 4 secured to the bottom of the container 5. These rockers are provided with flanges 6 so that longitudinal movement on the cross beams is avoided. The container is built of sheet metal and provided with transverse stiffeners 7 which serve not only to stiffen the container but also to prevent too ready longitudinal movement of the contents of the car. Openings 8 are provided to permit any liquid which may be directed into the car to flow from one compartment to another.

The car is tilted by means of a pair of pneumatic cylinders 9 and 10 pivoted between gusset plates upon the cross beams as indicated in Fig. 1. The pistons 11 and 12 are pivoted in lugs 13 on the rockers. By this arrangement the car may be readily rocked in both directions. The connections for supplying air are shown in Fig. 5; 14 being the supply reservoir, 15 and 16 being supply pipes leading to cross connections 17 and 18 which simultaneously supply the opposite ends of the two cylinders, and 19 the valve by which the flow from the reservoir is controlled. The valve also controls the exhaust so that when fluid is being supplied to one of the connections 17 or 18, exhaust is occurring from the other connection. The opposite sides of the car are provided with removable doors 20 and 21 which doors are automatically operated by the tilting of the container, the arrangement of the links shown in Fig. 2 accomplishing this result in the manner hereinafter described. Each end of the car is provided with the sets of links as shown in Fig. 2, the two doors operating in precisely the same manner so that a description of one set of links will suffice for both. The door 20 is preferably of the built up box construction indicated in Fig. 3, and is stiffened by the diagonal braces 22 (Fig. 1).

In order to secure as tight a joint at the bottom as possible the door is provided with a beveled facing 23 (Fig. 3) contacting with the floor of the container. This also tends to hold the bottom of the door against outward movement.

The door is pivotally supported at its upper edge by the shafts 24 located at each end thereof (Figs. 2 and 4). The shaft 24 is supported by the links 25 and 26 pivoted respectively to the container at 27 and to the pair of links 28 at 29. The pairs of links 28 are pivoted at their inner ends to the member 30 secured to the frame. This arrangement causes the right hand door 20 to be lifted bodily as the car tilts to the position of the dotted lines in Fig. 2, and on the other hand permits the door 21 to remain in closed position during such operation, the left hand pair of links 28 being free to rise. In order to cause the door to swing outwardly around its shaft 24 as it is raised and thus give greater clearance, the link 31 is provided, which link is pivoted to the container at its inner end and carries a wire rope 32 at its outer end. This rope 32 is secured to a wheel 33 such wheel being non rotatable with respect to the door. As the door moves out the wheel will be rotated counter clock-wise thus swinging the door to the position indicated in the dotted lines. The wheel is also provided with a stop 34 which is adapted to engage the end of the link 31 when the door is closed. This tends to still more securely maintain the door against outward movement. The upward movement of the door serves to automatically disengage the stop from the end of the link.

The bottom of the container is made inclined not only in order to provide against leakage of a certain amount of fluid contents but also to provide for greater angularity of the container relatively to the frame and thus facilitate the discharge of its contents, and avoid the sticking action which occurs where material is pressed tightly against a flat surface. The greater inclination of the outer half of the bottom when the container is tilted secured by this inclined bottom construction is indicated in Fig. 2. The inclined bottom also provides increased capacity in the container.

The provision of rockers instead of pivotal support for the container is advantageous as the container is by this means carried bodily outward and may be tilted to a greater degree than would otherwise be possible, though certain features of my improved construction are equally adaptable for use with pivotally supported containers and those wherein the operating cylinders are located at the ends of the containers instead of below the frame.

Having thus described my invention and illustrated its use, what I claim as new and desire to secure by Letters Patent is the following:—

1. In combination in a dump car, an elongated tilting container, and transverse stiffening partitions spaced along the container, openings being provided at the bottom of the partitions.

2. In combination in a dump car, an elongated tilting container having a depressed bottom, dish shaped in cross section, and transverse stiffening partitions spaced along the container and having their upper edges at substantially the height of the outer edges of the bottom.

3. In combination in a dump car, a frame, a container mounted for oscillation laterally upon the frame, and open at the side, a removable door for closing the side, a pair of links at each end of the car pivoted together and one having pivotal connection to the door and the other to the frame, and a third link at each end of the door having pivotal connection with the door and the container.

4. In combination in a dump car, a frame, a container mounted for oscillation laterally upon the frame, and open at the side, a removable door for closing the side, and pivotal connections at each end of the container for lifting the door and swinging its lower edge outward and upward comprising a pivotal connection between the frame and upper portion of the door, a pivotal connection between the upper portion of the door and the container and a pivotal connection from the container to a point on the door above the other connections with the door.

5. In combination in a dump car, a frame, a container mounted for oscillation laterally upon the frame, and open at the side, a removable door for closing the side, and pivotal connections at each end of the container for lifting the door and swinging its lower edge outward and upward comprising the pair of links 26 and 28 pivoted together, and to the frame, and the door at 24 respectively, the link 25 pivoted to the container and to the door and the link 31 secured to the door above the pivot 24 and pivoted to the container.

6. In combination in a dump car, a frame, a container mounted for oscillation laterally upon the frame, and open at the side, a removable door for closing the side, a pivotal support at each end of the door at the upper end thereof, a pair of links pivoted thereto and to the frame and container respectively, and a connection to the container whereby the door is swung about its pivotal support as the container tilts.

7. In combination in a dump car, a frame, a container mounted for oscillation laterally upon the frame, and open at the side, a removable door for closing the side, a pivotal support at each end of the door at the upper end thereof, a pair of links pivoted thereto and to the frame and container respectively, a stop carried by the door adjacent its pivotal support, and a catch for engaging the stop when the door is in closed position and restraining the door from pivotal movement about its support.

8. In combination in a dump car, a frame, a container mounted for oscillation laterally upon the frame, and open at the side, a removable door for closing the side, a pivotal support at each end of the door at the upper end thereof, a pair of links pivoted thereto and to the frame and container respectively, a stop carried by the door adjacent its pivotal support, and a link connected to the container and to the door above its pivotal support for swinging the door as it opens, and provided with a catch for engaging the stop when the door is in closed position.

9. In combination, in a dump car, a truck, a container mounted for tilting relatively to the truck and open at the side, and a door for closing the side, the floor of said container being depressed below the top of the outer edges thereof whereby to form a basin for the carrying of liquids.

10. In a dump car having a side door, a basin like container the edges of which are at the lower margin of said side door.

11. In combination in a side dump car, a basin like container having an open side, and a door for closing said side, said door being provided with an edge adapted to fit the contour of the rim of said basin.

12. In combination in a side dump car, a basin like container having an open side, a door for closing said side, said door being provided with an edge adapted to fit the contour of the rim of said basin, and a transverse stiffening member the lower edge of which is above the bottom of the container.

In testimony whereof I have hereunto signed my name in the presence of the two subscribed witnesses.

CLINTON F. BLAKE.

Witnesses:
PAUL CARPENTER,
DONALD C. WILLIAMS.